(12) United States Patent
Spadacini et al.

(10) Patent No.: US 10,914,174 B2
(45) Date of Patent: Feb. 9, 2021

(54) METHOD FOR THE CONSTRUCTION OF BLADED DISCS FOR RADIAL TURBOMACHINES AND A BLADED DISC OBTAINED BY MEANS OF THIS METHOD

(71) Applicant: EXERGY S.P.A., Bologna (IT)

(72) Inventors: Claudio Spadacini, Verbania Suna (IT); Dario Rizzi, Bisuschio (IT)

(73) Assignee: EXERGY INTERNATIONAL S.R.L., Olgiate Olona (IT)

( * ) Notice: Subject to any disclaimer, the term of this patent is extended or adjusted under 35 U.S.C. 154(b) by 191 days.

(21) Appl. No.: 16/090,425

(22) PCT Filed: Mar. 29, 2017

(86) PCT No.: PCT/IB2017/051784
§ 371 (c)(1),
(2) Date: Oct. 1, 2018

(87) PCT Pub. No.: WO2017/168335
PCT Pub. Date: Oct. 5, 2017

(65) Prior Publication Data
US 2019/0112929 A1    Apr. 18, 2019

(30) Foreign Application Priority Data

Mar. 30, 2016 (IT) .................. 102016000032704

(51) Int. Cl.
*F01D 5/04* (2006.01)
*B23P 15/00* (2006.01)
*F01D 5/22* (2006.01)

(52) U.S. Cl.
CPC ............ *F01D 5/041* (2013.01); *B23P 15/006* (2013.01); *F01D 5/225* (2013.01); *F05D 2230/10* (2013.01)

(58) Field of Classification Search
CPC ........ F01D 5/041; F01D 5/225; B23P 15/006; F05D 2230/10; B23K 9/013
See application file for complete search history.

(56) References Cited

U.S. PATENT DOCUMENTS

2005/0247569 A1 * 11/2005 Lamphere .............. B23K 9/013
205/663
2006/0272957 A1 * 12/2006 Lamphere ................ B23H 9/10
205/641

(Continued)

FOREIGN PATENT DOCUMENTS

CA    2943409 A1 *  9/2015   ............. F01D 5/041
GB    360177 A     11/1931

(Continued)

OTHER PUBLICATIONS

Jul. 6, 2017 Search Report issued in International Patent Application No. PCT/IB2017/051784.

(Continued)

*Primary Examiner* — Lee A Holly
(74) *Attorney, Agent, or Firm* — Oliff PLC

(57) ABSTRACT

The present invention concerns a method for the construction of bladed discs for radial turbomachines, comprising: preparing a disc (6, 14) provided with a front face (7); preparing a plurality of reinforcement rings (23) with different diameters. Preparing the disc (6, 14) comprises: realizing annular sets of blades (20) in one piece with the disc (6, 14), said sets (20) being concentric and coaxial with a central axis (X-X) and arranged on the front face (7), wherein each blade (20) has a leading edge (21) and a trailing edge (22) substantially parallel to the central axis (X-X); and/or preparing a plurality of reinforcement rings (23) comprises: realizing in one piece with each one of the reinforcement rings (23) an annular set of auxiliary blades (20') arranged around a central axis (X-X), wherein each (Continued)

auxiliary blade (20') has a leading edge (21') and a trailing edge (22') substantially parallel to the central axis (X-X). Each one of the reinforcement rings (23) is applied to the disc (6, 14) at one of the annular sets of blades (20) and/or auxiliary blades (20'), so as to define on the front face (7) annular sets of blades (20) and/or auxiliary blades (20'), each one provided with a respective reinforcement ring (23).

16 Claims, 10 Drawing Sheets

(56) References Cited

U.S. PATENT DOCUMENTS

| | | | | |
|---|---|---|---|---|
| 2009/0304473 A1* | 12/2009 | Holze | ............... | B23P 15/006 |
| | | | | 409/131 |
| 2013/0299457 A1* | 11/2013 | Rizzo, Jr. | ............. | B23H 9/10 |
| | | | | 219/69.11 |

FOREIGN PATENT DOCUMENTS

| | | |
|---|---|---|
| WO | 2014/064567 A1 | 5/2014 |
| WO | 2015/140711 A1 | 9/2015 |
| WO | 2015/170230 A1 | 11/2015 |

OTHER PUBLICATIONS

Jul. 6, 2017 Written Opinion issued in International Patent Application No. PCT/IB2017/051784.

\* cited by examiner

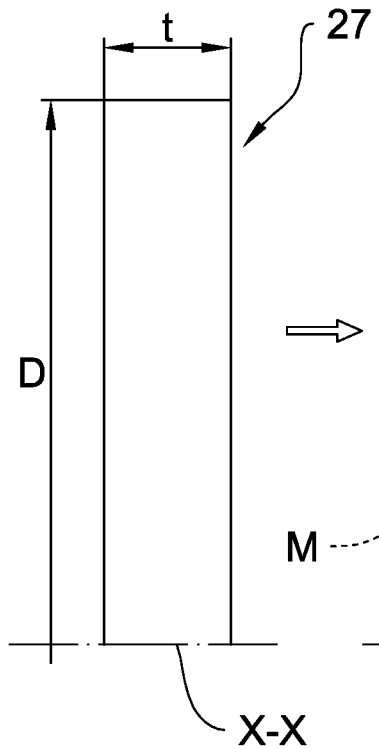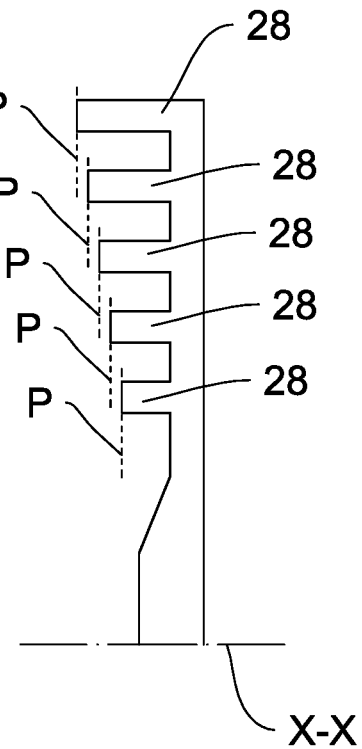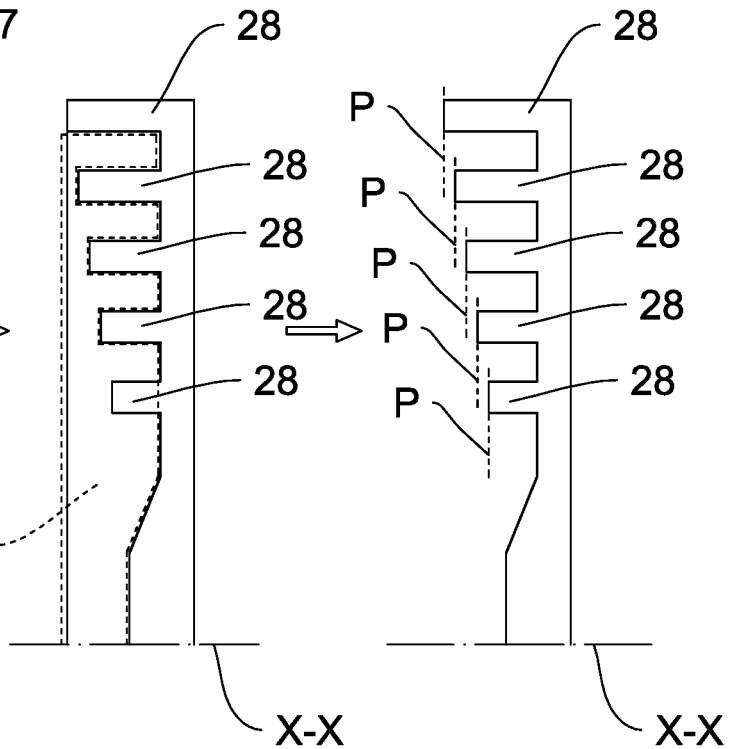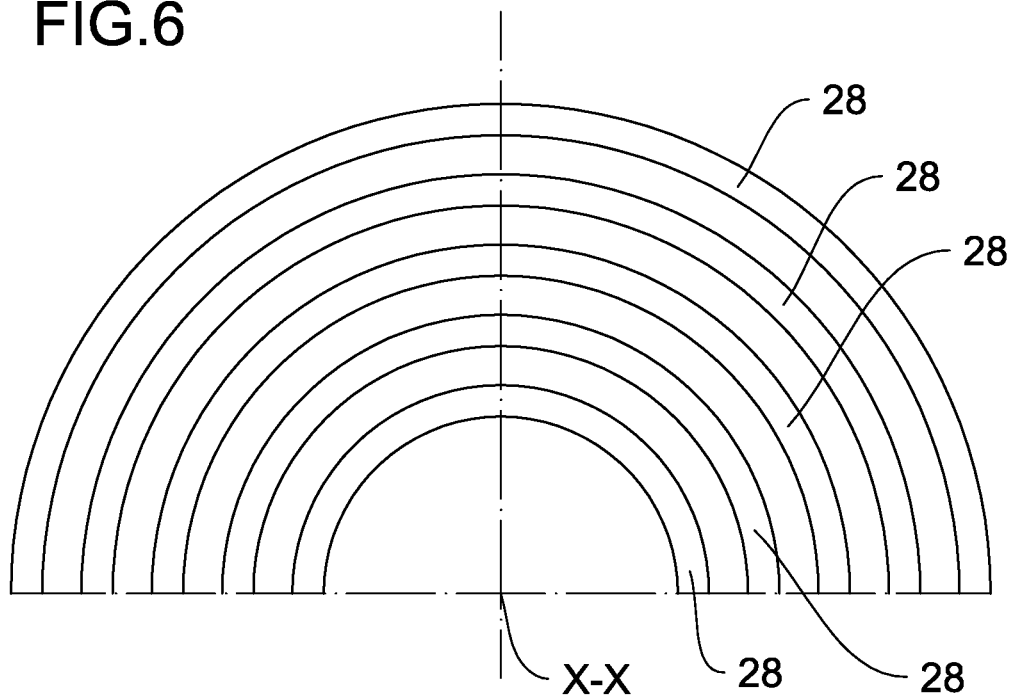

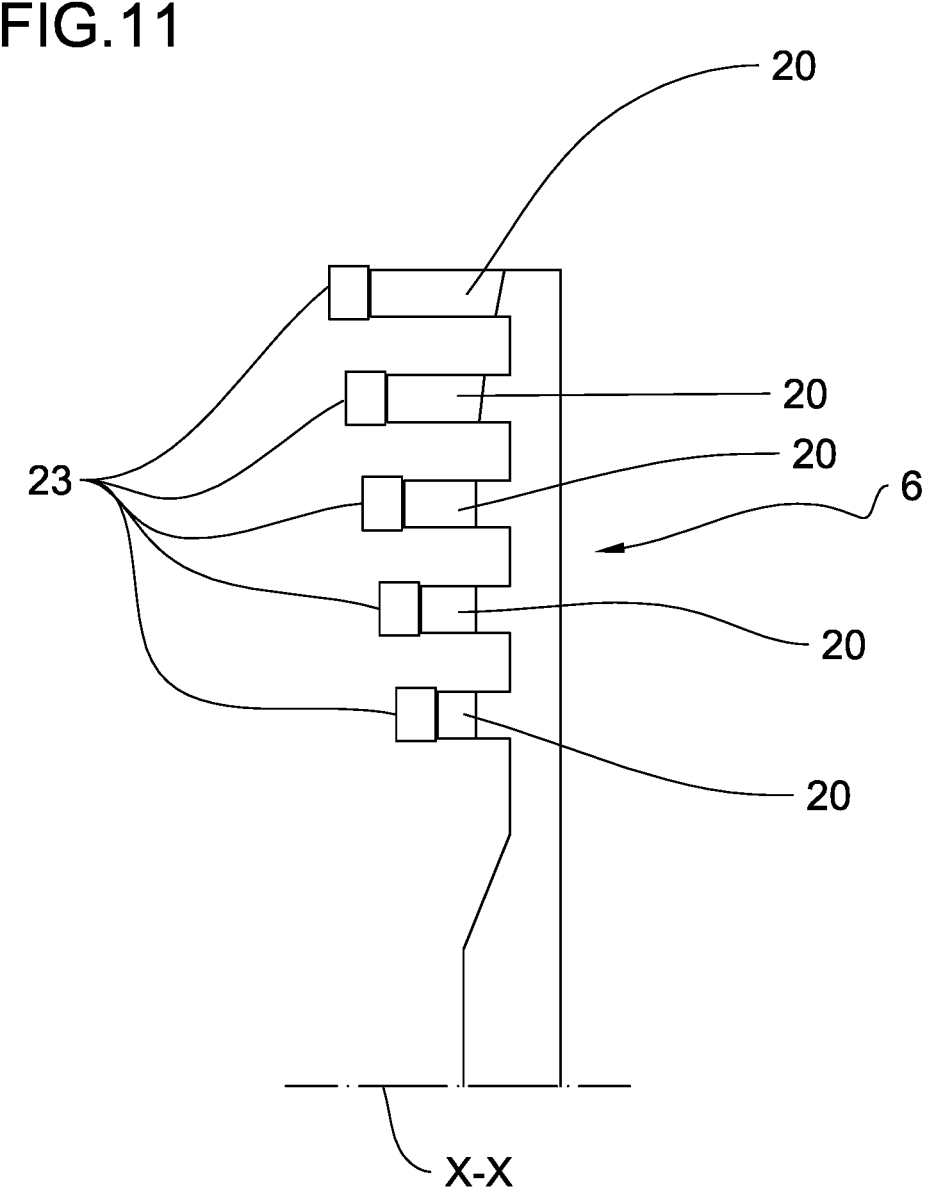

METHOD FOR THE CONSTRUCTION OF BLADED DISCS FOR RADIAL TURBOMACHINES AND A BLADED DISC OBTAINED BY MEANS OF THIS METHOD

FIELD OF THE INVENTION

The object of the present invention is a method for the construction of bladed discs for radial turbomachines and a bladed disc obtained by means of this method.

A radial turbomachine is intended as a turbomachine in which the flow of the fluid with which it exchanges energy is directed in a radial direction for at least part of the path completed in the same turbomachine. This radial part of the path is delimited by at least one annular set of blades through which the fluid moves prevalently in a radial direction with respect to an axis of rotation of the turbomachine.

A "bladed disc" comprises a plurality of annular sets of blades fastened on a front face of a disc. The sets are concentric and each set comprises a plurality of blades arranged equidistantly from a central axis of the disc.

The blades extend away from the front face with the leading and trailing edges of the blades being parallel or substantially parallel to the central axis.

The bladed disc further comprises a plurality of reinforcement rings, each one being connected to all the blades of an annular set at one end of said blades, that end being opposite the one connected to the front face of the disc.

The bladed disc can have the function of a stator (also called a stator plate and it is fixed with respect to a casing of the turbomachine and the blades thereof are stator blades) and of a rotor (called a rotor disc, it rotates together with the shaft of the turbomachine and the blades thereof are rotor blades and thus the central axis is the rotation axis).

The present invention is applied to both centrifugal radial (outflow) turbomachines and to centripetal (inflow) turbomachines. The present invention is applied to both driving turbomachines (turbines) and operating machines (compressors). Preferably, but not exclusively, the present invention refers to expansion turbines. Preferably, but not exclusively, the present invention concerns expansion turbines for producing electric power and/or mechanical power. Preferably, but not exclusively, the present invention refers to expansion turbines utilized in power plants that use geothermal sources, preferably by means of the Rankine cycle that uses water vapour or by means of the organic Rankine cycle (ORC).

BACKGROUND OF THE INVENTION

Public document U.S. Pat. No. 4,306,833 illustrates a compressor with an impeller equipped with a disc that has two annular sets of blades arranged at a peripheral area and each one is on one of the faces of the disc. The blades of each set extend into a respective annular chamber. The disc with the blades can be realized by die-casting. A ring is applied against each tip of the blades in a set, to eliminate loss due to the formation of vortices at said tips. Each ring is secured to the impeller by screws inserted in bosses afforded on the impeller.

Public document U.S. Pat. No. 6,508,631 illustrates a radial flow pump. The pump comprises a rotor and a plurality of blades arranged in concentric rings and extending from a first surface of the rotor in a direction substantially parallel to a central axis of rotation. The rotor and blades can be integrally formed from one piece of material. A support ring that reduces deflection due to centrifugal force can be positioned around the blades.

SUMMARY

Within this scope, the Applicant has perceived a need to improve the construction methods of the prior art for bladed discs for radial turbomachines, so as to accelerate the production thereof and cut the relative costs, while ensuring high quality such as to guarantee the reliability and efficiency of the turbomachines in which they are installed.

In fact, the Applicant has noted that production of the disc illustrated in document U.S. Pat. No. 4,306,833 by die-casting does not make it possible to obtain blades having precise geometries and thus with the high efficiency levels required, for example, in power plants for generating energy. Moreover, the compressor disclosed in that document substantially has only one stage split on the two faces of the disc of the impeller and it is not suited to managing elevated increases in enthalpy. Lastly, the bosses disclosed in U.S. Pat. No. 4,306,833 that make it possible to mount the rings of the rotor disc are located between two adjacent blades and they therefore disturb the flow of working fluid flowing through them.

The Applicant has also noted that the rotor disclosed in document U.S. Pat. No. 6,508,631 does not appear to have reinforcement rings and therefore it does not make it possible to reduce losses due to leakage and obtain the desired yield. Furthermore, neither one of these documents illustrates in detail the process for producing the respective rotors.

Within this scope, the Applicant set the following objectives:

offering a fast and relatively simple method for the construction of bladed discs, so as to reduce production costs;

offering a method for the construction of bladed discs which, in any case, makes it possible to improve the quality and structural precision thereof and thus the reliability and efficiency of the radial turbomachines in which they are installed.

The Applicant has found that the objectives indicated above and others as well can be achieved by realizing the blades from solid material, that is, by removing material from an initial single piece, wherein the blades are made from the solid material on the disc and/or on one or more of the reinforcement rings.

In particular, the objectives indicated and others as well are substantially achieved by a method for the construction of bladed discs for radial turbomachines, by a bladed disc and by a radial turbomachine according to one or more of the appended claims and/or in accordance with one or more of the following aspects.

In the present description and in the appended claims, the term "axial" is intended as defining a direction directed parallel to a central axis of the bladed disc or rotation axis "X-X" of the turbomachine. The adjective "radial" is intended as defining a direction directed as the radii extending perpendicularly from the central axis of the bladed disc or axis of rotation "X-X" of the turbomachine. The adjective "circumferential" is intended as directions tangent to circumferences coaxial with the central axis of the bladed disc or axis of rotation "X-X" of the turbomachine. More specifically, according to an independent aspect, the present invention concerns a method for the construction of bladed discs for radial turbomachines.

The method comprises preparing a disc provided with a front face.

The method comprises preparing a plurality of reinforcement rings with different diameters.

Preparing the disc comprises: realizing annular sets of blades in one piece with said disc, the sets of blades being concentric and coaxial with a central axis of said disc and arranged on said front face, wherein each blade has a leading edge and a trailing edge substantially parallel to said central axis.

Alternatively or additionally, preparing a plurality of reinforcement rings comprises: realizing in one piece with each one of the reinforcement rings an annular set of auxiliary blades arranged around a central axis of the reinforcement ring, wherein each auxiliary blade has a leading edge and a trailing edge substantially parallel to said central axis of the reinforcement ring.

The method comprises applying each one of the reinforcement rings to the disc at one of the annular sets of blades and/or auxiliary blades, so as to define on the front face annular sets of blades and/or auxiliary blades, each one provided with a respective reinforcement ring.

In other words, the method comprises realizing all of the blades from the solid material on the disc or realizing all of the blades from the solid material on each reinforcement ring or realizing several blades on the disc and others on one or more reinforcement rings and then joining the rings to the disc so as to form the complete annular sets of blades.

Preferably, preparing the disc comprises: preparing a solid disc; removing material from the solid disc to define on the front face a plurality of annular reliefs concentric and coaxial with a central axis of said disc.

Preferably, it is envisaged that material will be removed from each annular relief until one of the annular sets of blades is defined, for each annular relief; wherein each one of the reinforcement rings is applied on the terminal ends of the blades of the disc.

One embodiment comprises removing material from each annular relief until a root ring and the cited annular set of blades protruding from the root ring is defined, for each annular relief.

One embodiment comprises removing material from each annular relief until only a root ring, without blades, is defined, for each annular relief.

Preferably, preparing each reinforcement ring comprises: preparing a solid ring; removing material from the solid ring until a respective annular set of auxiliary blades is defined.

In one aspect, for each set, blades are made in one piece with said disc and auxiliary blades are made in one piece with the respective reinforcement ring; wherein applying each one of the reinforcement rings comprises: placing each auxiliary blade between two blades of an annular set of the disc and applying terminal ends of the auxiliary blades against the front face of the disc.

According to an additional independent aspect, the present invention concerns a method for the construction of bladed discs for radial turbomachines, wherein the method comprises:
(i) preparing a solid disc;
(ii.) rough-cutting the solid disc, removing material from the solid disc to define a disc, on a front face of which there is provided a plurality of annular reliefs concentric and coaxial with a central axis of said disc;
(iii.) removing material from each annular relief until an annular set of blades arranged around the central axis is defined, for each annular relief, wherein each blade has a leading edge and a trailing edge substantially parallel to said central axis;
(iv.) preparing a plurality of reinforcement rings with different diameters and each one corresponding to one of the annular sets of blades;
(v.) applying each one of the reinforcement rings on the terminal ends of the blades of a respective annular set.

The definition "substantially parallel to said central axis" referring to the leading edge and to the trailing edge is intended to mean that the leading edge and the trailing edge can be rectilinear or curvilinear or shaped in another manner, but in any case, they extend along a direction that is parallel to the central axis. In other words, the leading edge radially faces inwards (centrifugal radial turbomachine) or outwards (centripetal radial turbomachine) and the trailing edge radially faces outwards (centrifugal radial turbomachine) or inwards (centripetal radial turbomachine).

The Applicant has verified that the method according to the invention makes it possible to work with extreme precision and relatively easily on the face of the disc intended to bear the blades and/or on the face of the reinforcement ring(s) intended to bear the auxiliary blades. In fact, the tool or tools can move and work frontally on said face without being subject to particular restrictions. The blades are defined precisely during this step and therefore the formation thereof is an easy, quick and precise process.

Preferably, but not necessarily, the initial solid disc and/or the initial solid rings are forged.

Preferably, the initial solid disc has a ratio of a diameter thereof to an axial length thereof greater than two.

Preferably, but not necessarily, the rough-cutting of the solid disc to form the annular reliefs (step of semi-finishing the disc) is carried out by turning or by boring. The volume of each annular relief is such as to contain the blades defined in the next step.

Preferably, the height of the blades, that is, their axial extension, and all of the other geometrical dimensions thereof characteristic of the median plane of expansion, are defined during the process of rough-cutting the solid disc and/or the solid ring(s).

Preferably, the method comprises defining support surfaces for resting the reinforcement rings against the blades. Each support surface is the surface in which the end surface of a respective annular relief lies. This support surface can be a support plane perpendicular to the central axis or a truncated cone surface.

In one aspect, removal of material to define the blades and/or the auxiliary blades (step of finishing the blades) is carried out by milling, preferably frontal milling and preferably by means of a ball nose end mill. Preferably, the feed rate of the mill is comprised between about 100 mm/min and about 8000 mm/min. Preferably, the depth of cut of the mill is comprised between about 0.005 mm and 5 mm. Preferably, the tangential speed of the mill is comprised between about 60 m/min and about 200 m/min. Preferably, the rotational speed of the mill is comprised between about 1000 rpm and about 25000 rpm. Preferably, the ratio of a height of the blade to a diameter of the mill is less than about fifteen.

In one aspect, the removal of material to define the blades is carried out by means of electrical discharge machining. Preferably, the realization of the blades and/or auxiliary blades comprises: applying at least one electrode, which is complementarily-shaped to the blades (or shaped like the volume comprised between two adjacent blades), against at least one annular relief, preferably against the end surface of the annular relief, and/or against at least one solid ring. Preferably, said at least one electrode has a single working portion shaped like the volume comprised between two blades and/or between two adjacent auxiliary blades, to remove material between said two blades and/or between two auxiliary blades and to define the passage between said two blades and/or between two auxiliary blades. Preferably, said at least one electrode has a plurality of working portions spaced one away from the other (so as to define a comb-like shape) and each one shaped like the volume comprised between two adjacent blades and/or between two adjacent auxiliary blades, to remove material between a number of adjacent blades at the same time and/or between two adjacent auxiliary blades and to define passages between said blades and/or auxiliary blades. Preferably, said at least one electrode is advanced in a direction parallel to the central axis. Preferably, the feed rate of said at least one electrode is comprised between about 10 mm/min and about 100 mm/min.

In one aspect, the removal of material to define the blades is carried out by first removing material by milling until the depth permits it and completing the work by electrical discharge machining.

The aim of this blade finishing step is to remove the greatest amount material in the least amount of time, paying close attention to the quality of the surface (roughness Ra, for example, ranging between 0.02 and 32) and precision (for example ranging between +/−0.01 mm and +/−0.5 mm. The result of this step is that a disc is obtained with all the annular sets of blades open, that is, the blades project out in a cantilever fashion from the disc, and/or one or more reinforcement rings with the respective set(s) of auxiliary blades open, that is, the auxiliary blades project out in a cantilever fashion from the respective ring.

In one aspect, defining an annular set of blades for each annular relief comprises: shaping a root ring attached to the front face of the disc; wherein the blades of the respective annular set protrude from said root ring. In other words, the annular relief defined previously by rough-cutting has a root portion that is adjacent to the front face and that is not substantially machined during the formation of the blades and a distal portion that is machined and from which said blades are obtained. The root portion defines the root ring. Preferably, at least one of the root rings is shaped so as to define a truncated-cone surface from which the blades protrude. This truncated-cone surface is the surface that defines the divergence or convergence of the passage for the working fluid (flaring).

The blades and the root rings are thus fashioned as one piece with the disc.

In one aspect, applying the reinforcement rings comprises: joining a reinforcement ring to terminal ends of the blades of a respective annular set and/or joining terminal ends of the auxiliary blades to the disc through connection devices placed on said terminals ends. Preferably, said connection devices comprise: screws and/or pegs and/or braze welding and/or jointing.

To prevent the means joining the reinforcement ring to the blades and/or auxiliary blades to the disc from being affected by radial stress due to thermal expansion and/or from the centrifugal field (if the disc is a rotor disc), it is possible to pin the rings to the blades. The pins can be inserted in all the blades or alternated with the connection device.

In one aspect, the connection devices comprise a screw inserted in the terminal end of each blade and two pins placed at the sides of said screw.

In a different aspect, the connection devices comprise a screw inserted in the terminal end of a blade and a pin inserted in the terminal end of the adjacent blade.

In one aspect, preparing a plurality of reinforcement rings comprises: realizing in one piece with each one of the reinforcement rings an annular set of auxiliary blades arranged around a central axis of the reinforcement ring. Each auxiliary blade has a leading edge and a trailing edge substantially parallel to said central axis of the reinforcement ring.

In one aspect, applying each one of the reinforcement rings comprises: placing each auxiliary blade between two blades of an annular set of the disc and applying terminal ends of the auxiliary blades against the front face of the disc.

In other words, according to this variant of the method, half of the blades of a set are obtained as one piece from the disc and the other half of said blades (auxiliary blades) of the same set are obtained from the respective reinforcement ring. The blades obtained in one piece with the disc are spaced apart by a pitch that is double that of the finished bladed disc and the auxiliary blades of the reinforcement ring are also spaced apart by a pitch that is double that of the finished bladed disc. Once the reinforcement ring has been mounted on the disc, the set of blades is formed by the alternation of blades of the disc and auxiliary blades and the pitch (circumferential distance between a blade and the adjacent auxiliary blade) is the correct pitch. In this manner, the machining of each individual part proves to be a simpler process. For example, the size of the mill can be larger and thus also the height of the blade that can be realized by milling alone.

Preferably, applying terminal ends of the auxiliary blades against the front face of the disc comprises: joining the terminal ends of the auxiliary blades to the disc through connection devices placed on said terminal ends. Preferably, said connection devices comprise: screws and/or pegs and/or braze welding and/or jointing. In this case as well, the reinforcement rings can be pinned to the blades of the disc so as to prevent the connection device joining the reinforcement ring from being affected by radial stress due to different levels of thermal expansion and/or stress from the centrifugal field (if the bladed disc is a rotor disc).

According to one aspect, the present invention concerns a bladed disc for radial turbomachines realized according to the method disclosed hereinabove and/or in accordance with the appended claims.

According to one aspect, the present invention concerns a radial turbomachine comprising at least one bladed disc realized according to the method disclosed hereinabove and/or in accordance with the appended claims.

In one aspect, the bladed disc is a rotor or rotor disc.

In one aspect, the bladed disc is a stator or stator plate.

In one aspect, the radial turbomachine is a centrifugal radial turbine, for example with a single rotor disc or with two counter-rotating rotor discs.

Further characteristics and advantages will become more apparent from the detailed description of a radial turbomachine, of preferred, but not exclusive, embodiments of a bladed disc for radial turbomachines and of a method for the construction thereof according to the present invention.

DESCRIPTION OF THE DRAWINGS

This description is provided herein below with reference to the attached drawings, which are provided solely for purpose of providing approximate and thus non-limiting examples, and of which:

FIG. 3 is a side view of one half of an initial solid disc;

FIG. 4 is an illustration of the disc of FIG. 3, highlighting the material to be removed in a rough-cutting step;

FIG. 5 is an illustration of the disc of FIG. 3 following the rough-cutting step;

FIG. 6 is a front view of the disc of FIG. 5;

FIG. 11 is a view illustrating the disc of FIG. 3 following application of the reinforcement rings;

DETAILED DESCRIPTION

With reference to the figures cited hereinabove, a radial turbomachine is indicated in its entirety by the reference number 1.

Figure 1:
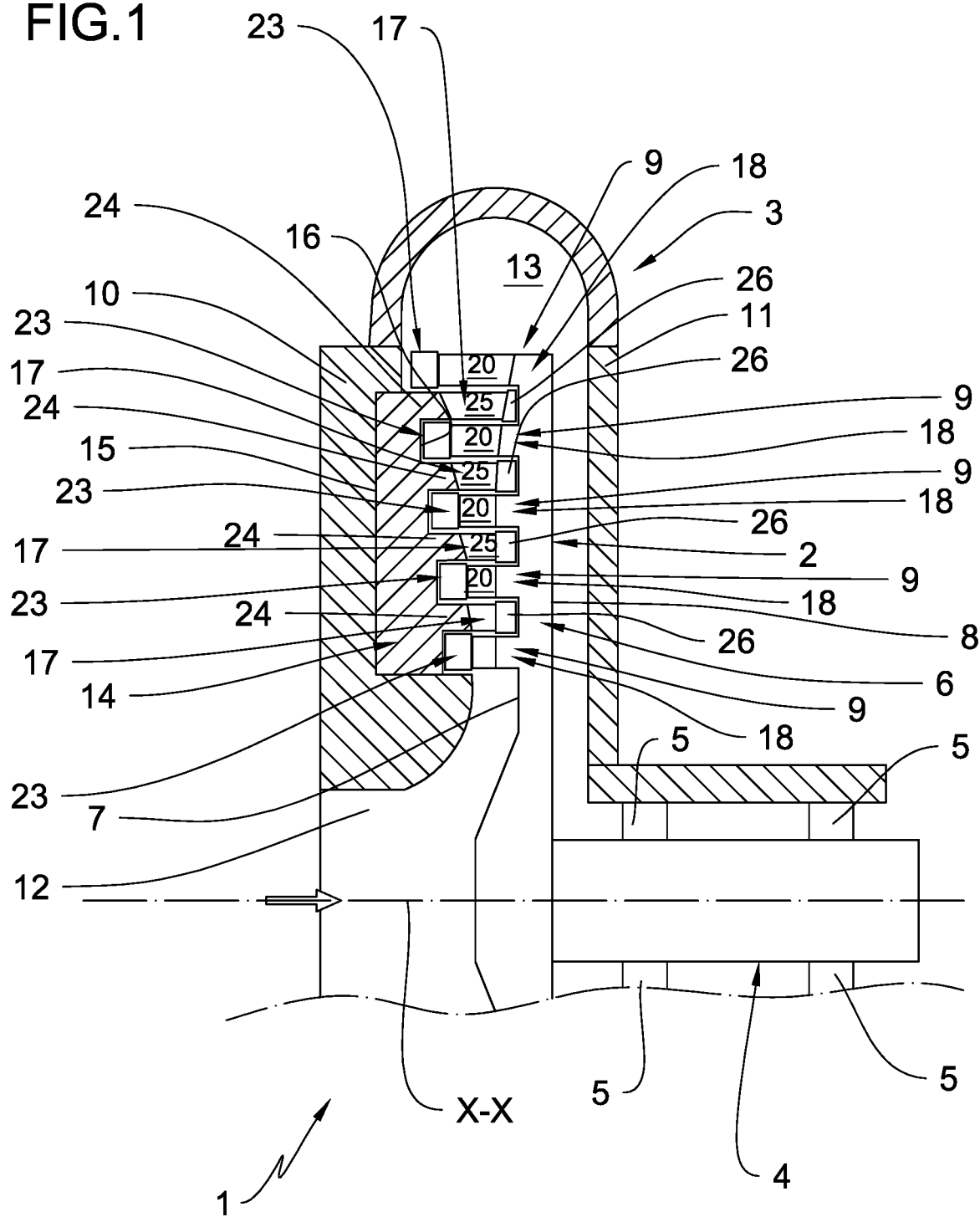
FIG. 1 is a meridian section of a radial turbomachine comprising two bladed discs according to the present invention.

The radial turbomachine 1 illustrated in FIG. 1 is an expansion turbine of the centrifugal radial type with one rotor 2. For example, this turbine 1 can be used in the field of power plants for generating energy, of the Rankine cycle type, organic ORC (Organic Rankine Cycle) or that uses water vapour, and which use geothermal resources as sources of energy.

The turbine 1 comprises a fixed casing 3 in which the rotor 2 is rotatably housed. For this purpose, the rotor 2 is rigidly connected to a shaft 4 that extends along a central axis "X-X" (which coincides with an axis of rotation of the shaft 4 and of the rotor 2) and it is supported in the fixed casing 3 by suitable bearings 5. The rotor 2 comprises a rotor disc 6 that is directly connected to the above-mentioned shaft 4 and provided with a front face 7 and an opposite rear face 8. The front face 7 bears in a cantilever fashion a plurality of bladed rotor rings concentric and coaxial with the central axis "X-X".

The fixed casing 3 comprises a front wall 10, located in front of the front face 7 of the rotor disc 6, and a rear wall 11, located in front of the rear face 8 of the rotor disc 6. The front wall 10 has an opening defining an axial inlet 12 for a working fluid. This axial inlet 12 is located at the central axis "X-X" and it is circular and concentric with the axis "X-X". The fixed casing 3 also has a passage volute 13 for the working fluid and that is located in a peripheral position radially external to the rotor 2 and in fluid communication with an outlet (unillustrated) from the fixed casing 3.

A stator plate 14 positioned in front of the rotor disc 6 is located and fixed on an internal face of the front wall 10. A rear face 15 of the stator plate 14 is applied against the front wall 10 of the fixed casing 3 and a front face 16 of the stator plate 14 faces the front face 7 of the rotor disc 2.

The front face 7 of the stator plate 14 bears in a cantilever fashion a plurality of bladed stator rings 17 concentric and coaxial with the central axis "X-X". The bladed stator rings 17 extend inside the casing 3 towards the rotor disc 6 and they are radially alternated with the bladed rotor rings 9 so as to define a radial expansion path for the working fluid that enters through the axial inlet 12 and expands radially moving away towards the periphery of the rotor disc 2 until it enters the passage volute 13 and then exits the fixed casing 3 through the above-mentioned outlet (unillustrated).

The bladed rotor rings 9 and the bladed stator rings 17 are structurally similar to each other and among them. The structure of the rotor disc 6 and an example of a method the construction of the rotor disc 6 are described herein below. The structure of the stator plate is similar and the same method can be used to realize said stator plate 14 as well. In general, this method is used to construct bladed discs (stator and rotor discs) for radial turbomachines.

Figure 2:
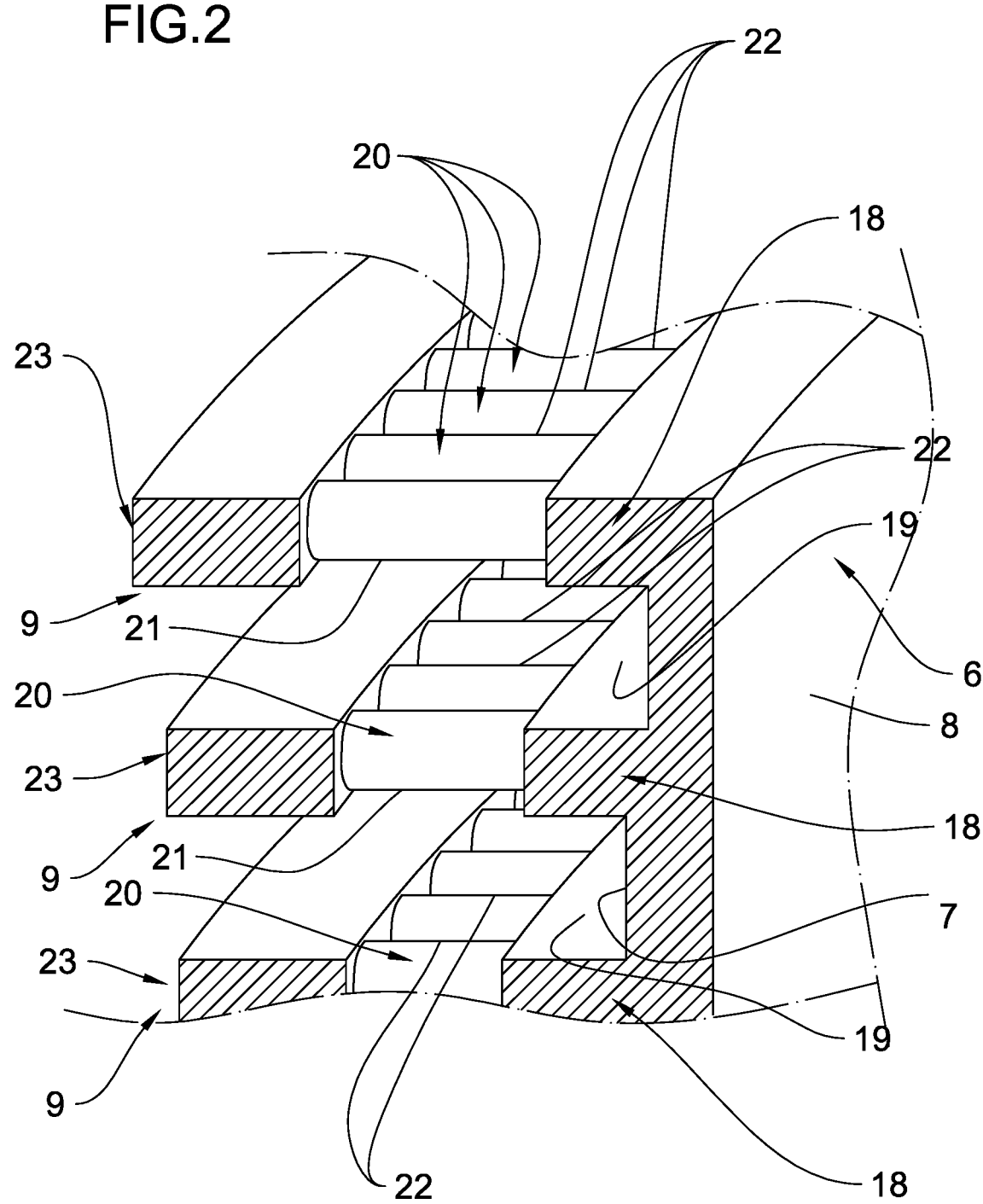
FIG. 2 is a partial perspective cutaway view of one of the bladed discs of FIG. 1.

A portion of the rotor disc 6 realized using this method is illustrated in FIG. 2. As can be seen in FIGS. 1 and 2, the rotor disc 6 comprises five root rings 18 (of which only three can be seen in FIG. 2) concentric and coaxial with the central axis "X-X". The five root rings 18 extend on the front face 7 and they are radially spaced away from each other, so as to delimit four annular and concentric root hollows 19 between them. Said five root rings 18 are made in one piece with the rotor disc 6.

Each one of the root rings 18 bears an annular set of rotor blades 20 that are equidistant from the central axis "X-X". The rotor disc 6 thus bears a plurality of annular sets of rotor blades 20 that are concentric and coaxial with the central axis "X-X". The rotor blades 20 of one set are circumferentially spaced by one pitch and two adjacent blades delimit a passage for the working fluid between them.

Each rotor blade 20 extends from an end surface of the root ring 18. The rotor blades 20 extend away from said end surface of the root ring 18 and from the front face 7 of the rotor disc 6 with leading edges 21 and trailing edges 22 thereof parallel or substantially parallel to the central axis "X-X". Given that the illustrated turbine 1 is of the centrifugal radial type, the leading edges 21 radially face the central axis "X-X" and the trailing edges 22 radially face outwards.

Terminals ends, opposite the root ring 18, of the rotor blades 20 of each annular set are connected to each other by a reinforcement ring 23. The illustrated rotor disc 6 thus has five reinforcement rings 23 concentric and coaxial with the central axis "X-X".

As mentioned above, the stator plate 14 is similar in structure. In particular, the stator plate 14 comprises four concentric bladed stator rings 17. Each bladed stator ring 17 comprises a root ring 24, an annular set of stator blades 25 and a reinforcement ring 26.

Each bladed stator ring 17 is radially interposed between two bladed rotor rings 9 and configured to rotate with respect to the them. Each reinforcement ring 26 of a bladed stator ring 17 is placed in a root hollow 19 of the rotor disc 6. The annular sets of rotor blades 20 are radially alternated with the annular sets of stator blades 25 so as to delimit the above-mentioned radial expansion path for the working fluid.

With reference to the rotor disc 6, the method for its construction comprises realizing the actual disc, the root rings 18 and the rotor blades 20 in one piece starting from one solid disc 27.

In particular, said solid disc 27 (FIG. 3) is first realized by means of a forging process. The solid disc 27 has a diameter "D" and an axial length (or thickness) "t". The solid disc 27 is made of a material that is preferably stainless steel, for example: AISI 410, AISI 420, AISI 630 (PH17-4) or PH 13-4. The diameter "D" is substantially equal to the diameter of the finished rotor disc 6. The thickness "t" is at least equal to the axial length of the radially outermost bladed rotor ring 9, excluding the root ring 23. For example, a ratio of the diameter "D" to the axial length "t" is equal to about eight.

The solid disc 27 is rough-cut for example by turning or boring, to remove material "M" (FIG. 4) from the front face 7 and to delimit on said front face 7 a plurality of annular reliefs 28 that are concentric and coaxial with the central axis "X-X" of the disc (FIGS. 4, 5 and 6). The five annular reliefs 28 illustrated will each form a root ring 18 and an annual set of rotor blades 20. The volume of each annular relief 28 is such as to contain the root ring 18 and the rotor blades 20 that will be defined in the next step. As can be observed in FIGS. 4 and 5, the axial extension of each annular relief 28 formed in this step is substantially the same as the definitive extension of the rotor blades 20, that is, it corresponds to the sum of the height "h" of the rotor blades 20 and the axial length "y" of the root ring 18. Moreover, in this rough-cutting step, a support plane "P" perpendicular to the central axis "X-X" is defined for each annular relief 28, in which an end surface 28' of said annular relief 28 lies, that is, the end surfaces of the rotor blades 20 obtained therefrom.

Subsequently, the method comprises removing material from each annular relief 28 until the root ring 18, which remains attached to the disc, and the annular set of rotor blades 20 arranged around the central axis "X-X" are defined, for each annular relief 28. In this step, the passages between adjacent rotor blades 20 are defined and at each rotor blade 20, the aerodynamic profile thereof is conferred (FIGS. 7, 8, 9 and 10). The result of this step is that a disc is obtained with all the annular sets of rotor blades 20 open, that is, the blades 20 project out from the disc in a cantilever fashion. Moreover, the rotor blades 20 are obtained with high precision (+/−0.01 mm) and good quality of the surface (Ra=5).

According to one embodiment (FIG. 9), the removal of material to define the rotor blades 20 and the root ring 18 is carried out with a mill 29 by frontal milling, for example by means of a ball nose end mill, according to the parameters listed below in Table 1.

TABLE 1

| frontal milling | |
| --- | --- |
| Blade height (h) | 18 mm |
| Diameter of the mill (d) | 3 mm |
| Ratio of blade height to diameter of the mill (h/d) | 6 |
| Feed rate | 1000 mm/min |
| Depth of cut | 3 mm |
| Tangential speed | 100 m/min |
| Rotational speed | 5000 rpm |

According to a variant (FIG. 10), the removal of material to define the rotor blades 20 and the root ring 18 is carried out by means of electrical discharge machining. A working portion 30 of an electrode shaped like the empty volume to be obtained between two adjacent rotor blades 20 is applied frontally (moving it in an axial direction "x" or parallel to the central axis "X-X") against the end surface 28' of said annular relief 28, according to the parameters listed below in Table 2.

TABLE 2

| electrical discharge machining | |
| --- | --- |
| Feed rate | 20 mm/min |
| Working current/peak current | 600 A |

According to an additional variant, the electrode has a plurality of working portions 30 spaced one away from the other and each one shaped like the volume between two adjacent rotor blades 20. This electrode is thus capable of removing material between a number of blades 20 at the same time and defining the passages between said blades.

In accordance an additional variant, the removal of material to define the rotor blades 20 and the root ring 18 is carried out by first removing material by frontal milling (as described above) until the depth permits it, and completing the work by electrical discharge machining (as described above).

Figure 7:
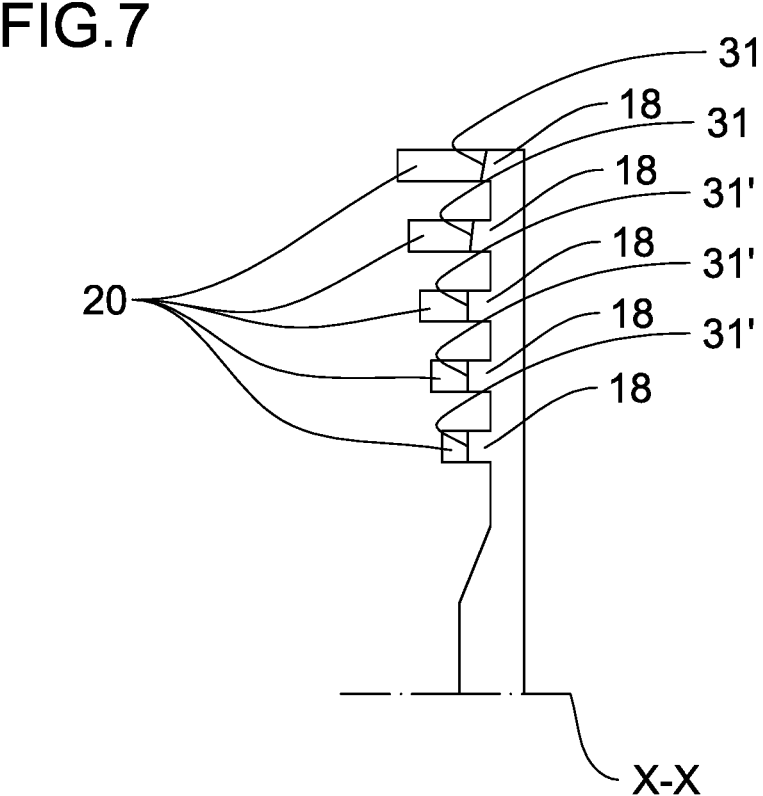
FIG. 7 is an illustration of the disc of FIG. 3 following a step of defining the blades.
Figure 8:
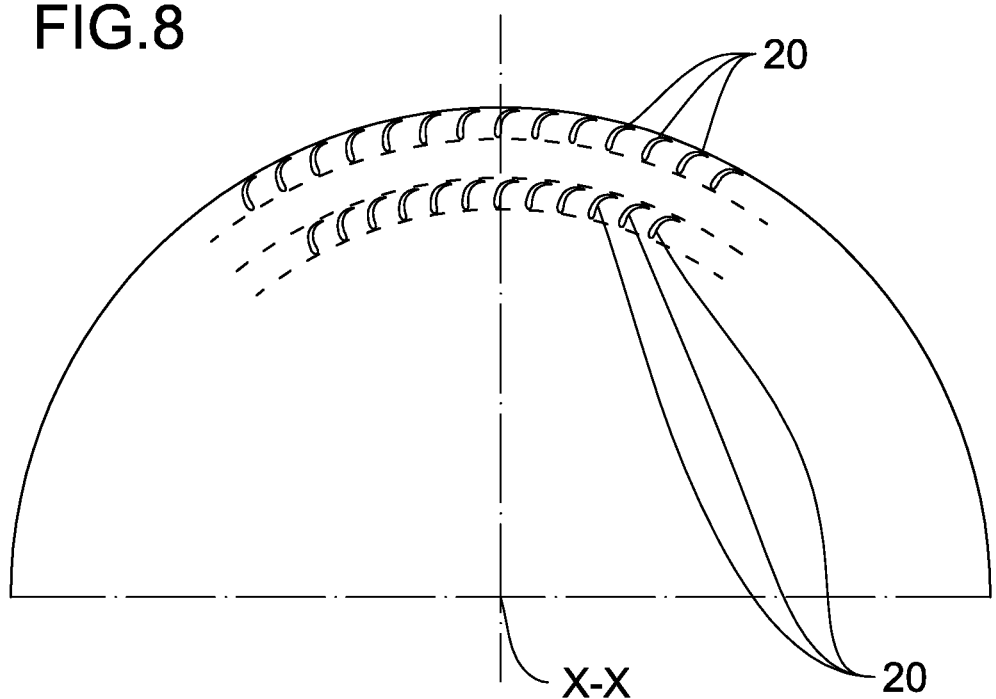
FIG. 8 is a front view of the disc of FIG. 7.
Figure 9:
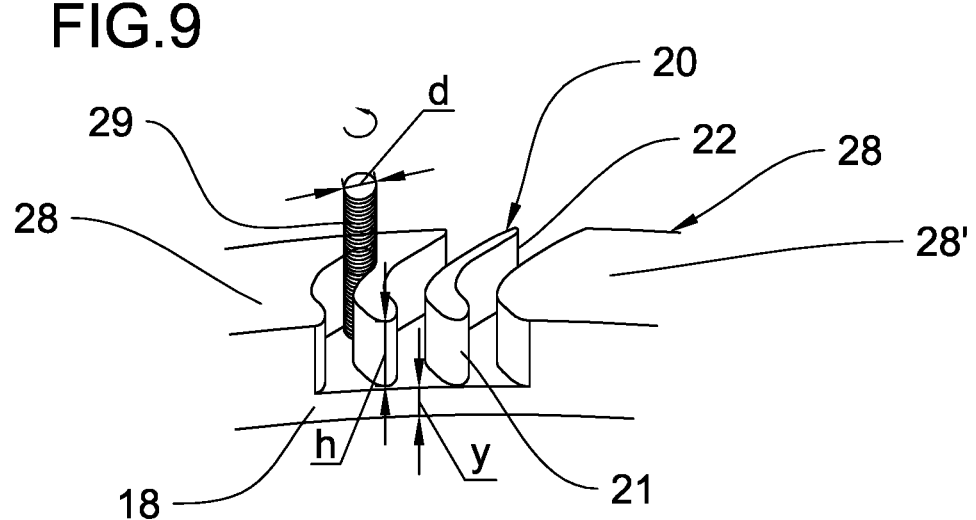
FIG. 9 is a perspective view illustrating the step of defining the blades.
Figure 10:
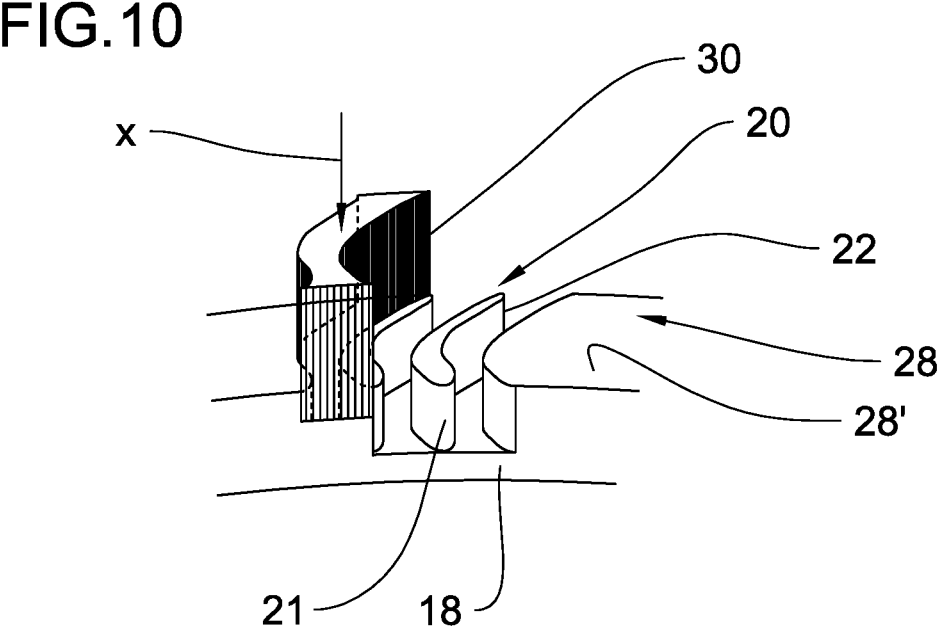
FIG. 10 is a perspective view illustrating a variant of the step of defining the blades.

As can be seen in FIG. 7, the two radially outermost root rings 18 have a surface 31 from which the rotor blades 20 protrude, said surface being a truncated-cone surface, so as to define the divergence of the passage for the working fluid (flaring). However, the surface 31' from which the rotor blades 20 of the three radially innermost root rings 18 protrude lies in a plane perpendicular to the central axis "X-X".

Five reinforcement rings 23 are prepared separately, each one with radial dimensions corresponding to one of the annular sets of rotor blades 20. As illustrated in FIG. 11, each reinforcement ring 23 is applied against the end surfaces of the rotor blades 20 of the respective set (which define the above-mentioned support plane "P" perpendicular to the central axis "X-X") and joined to the terminal ends of the blades 20.

FIGS. 12a-12e show several possible connection devices placed on said terminal ends and that are suited to this purpose.

Figure 12A:
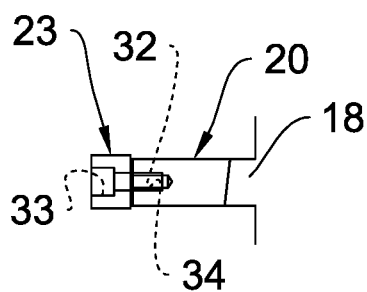
FIGS. 12a-12e are views illustrating variant embodiments of a detail of the disc of FIG. 11.
Figure 12B:
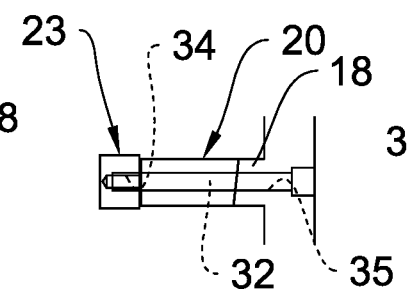
Figure 12C:
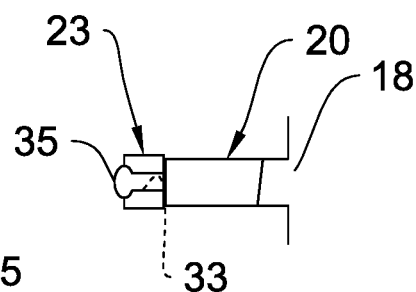
Figure 12D:
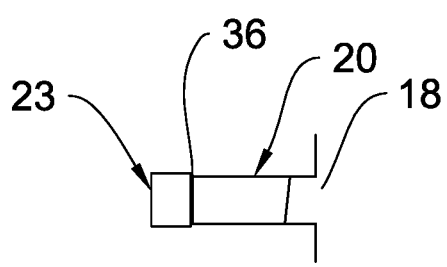
Figure 12E:
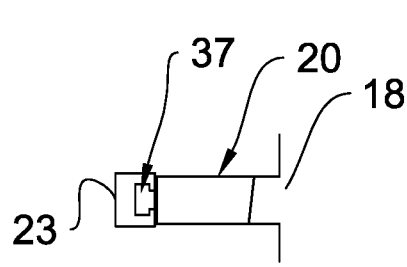

FIG. 12a illustrates a screw 32 (of a plurality of screws) that passes through a through hole 33 afforded in the reinforcement ring 23 and screwed into a threaded seat 34 afforded in the rotor blade 20. FIG. 12b illustrates a screw 32 (of a plurality of screws) that passes through a through hole 33 afforded through the disc 6, the root ring 18 and the rotor blade 20 and screwed into a threaded seat 34 afforded in the reinforcement ring 23. FIG. 12c illustrates a peg 35 solidly constrained to the rotor blade 20, inserted in a through hole 33 afforded in the reinforcement ring 23 and riveted. FIG. 12d illustrates a braze weld 36 interposed between the blade 20 and the reinforcement ring 23. FIG. 12e shows a jointing 37 realized between the blade 20 and the reinforcement ring 23.

In addition to the connection devices mentioned, pins 38 can be provided and inserted in specific holes 39 afforded in the reinforcement ring 23 and in the rotor blades 20.

Figure 13:
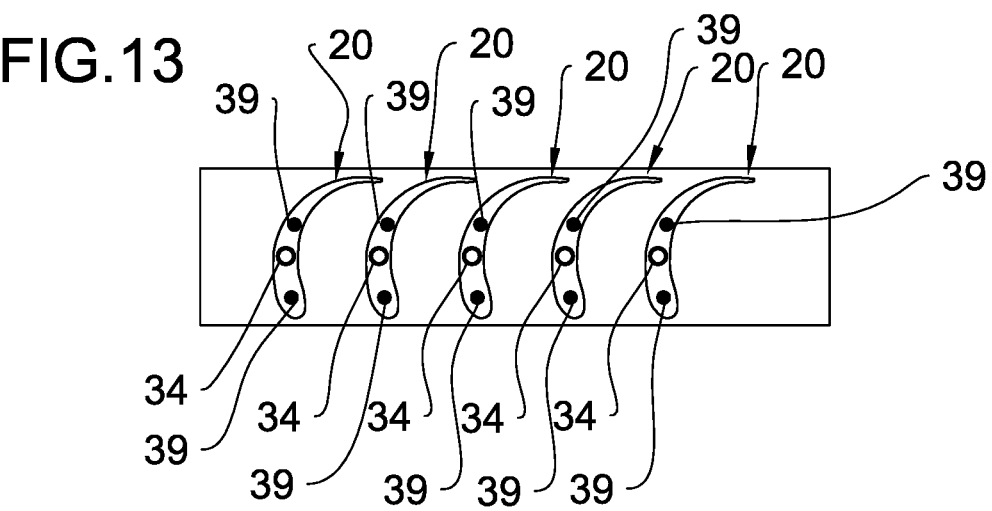
FIG. 13 is a schematic partial front view of the disc of FIG. 11.

For example, according to that which is illustrated in FIG. 13, each rotor blade 20 has a threaded seat 34 in which the screw 32 (of FIG. 12a) is screwed and two holes 39 placed at the sides of the threaded seat 34 in which two pins 38 are set.

Figure 14:
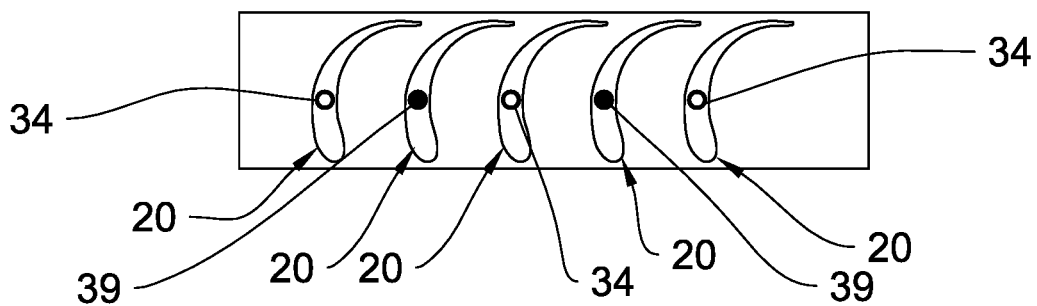
FIG. 14 is a view illustrating a variant of the solution appearing in FIG. 13.

The reinforcement ring 23 has the above-mentioned through hole 33 and two lateral seats (unillustrated) for the pins 38. According to that which is illustrated in the variant of FIG. 14, a rotor blade 20 has a threaded seat 34 in which the screw 32 (of FIG. 12a) is screwed, while each one of the two adjacent blades 20 has a hole 39 for a pin 38.

Figure 15:
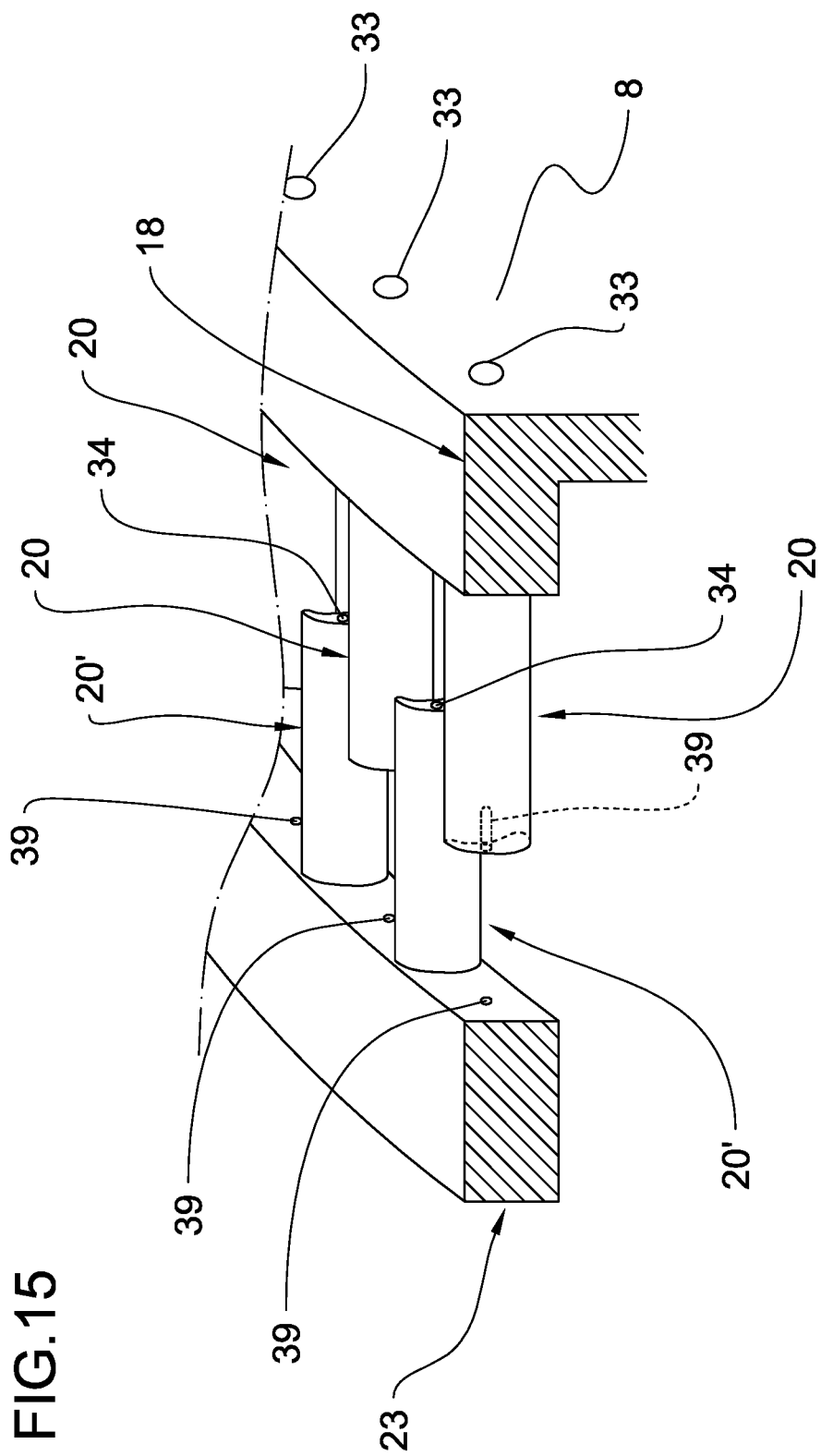
FIG. 15 is a view illustrating the view appearing in FIG. 2, according to a variant of the construction method.
Figure 16:
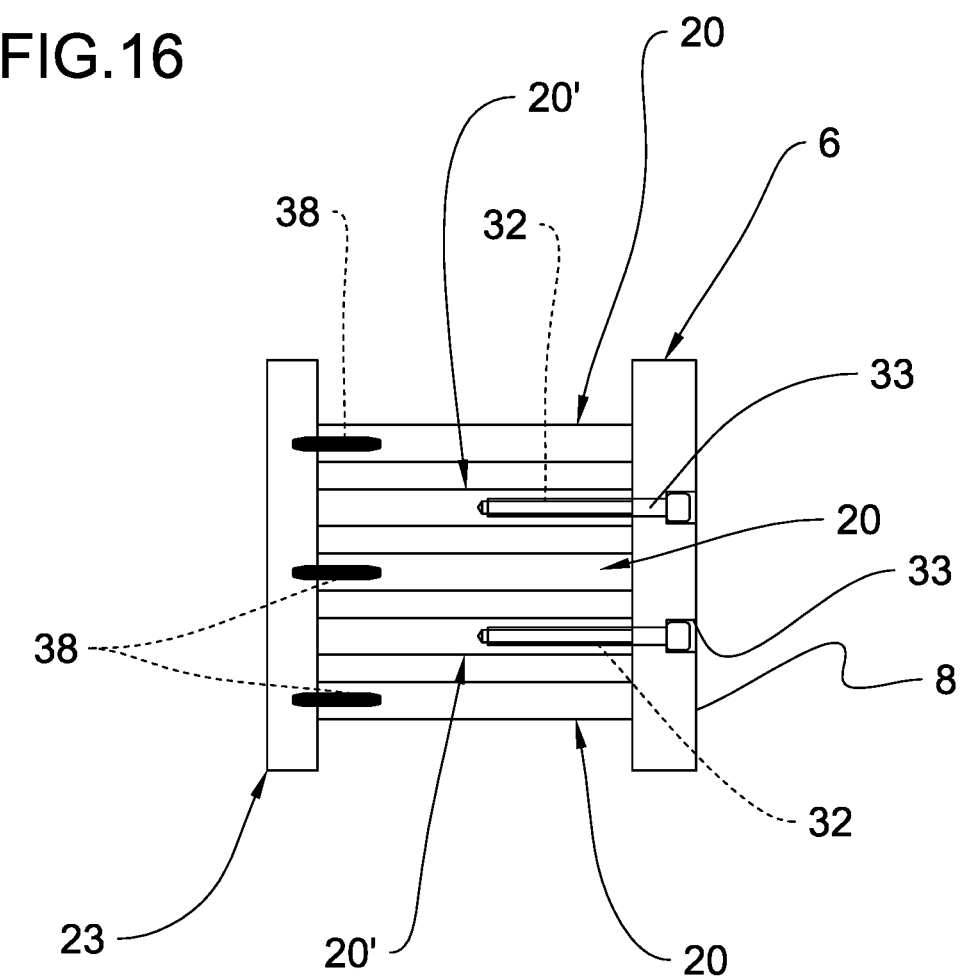
FIG. 16 is a schematic view of the assembled disc appearing in FIG. 15.

FIGS. 15 and 16 illustrate a variant of the construction method specified hereinabove. In accordance with this variant, half of the rotor blades 20 of an annular set are made in one piece with the rotor disc 6, while the other half of said rotor blades of the same set, called auxiliary rotor blades 20', are made in one piece with the respective reinforcement ring 23.

The method according to the variant thus comprises making an annular set of auxiliary blades 20' in one piece with each one of the reinforcement rings 23 (e.g. by milling or electrical discharge machining as described hereinabove for the first embodiment), said auxiliary blades 20' being arranged around the central axis "X-X" of the reinforcement ring 23, applying each one of the reinforcement rings 23 by arranging each auxiliary blade 20' between two blades 20 of the same annular set of the rotor disc 6, and applying terminal ends of the auxiliary blades 20' against the front face 7 of the rotor disc 6.

As illustrated in FIG. 15, the pitch of the rotor blades 20 made in one piece with the rotor disc 6 is double that of the complete annular set. The pitch of the auxiliary rotor blades 20' made in one piece with the reinforcement ring 23 is also double that of the complete annular set. Each auxiliary blade 20' has a leading edge 21' and a trailing edge 22' substantially parallel to the central axis "X-X" of the reinforcement ring 23.

The rotor disc 6 has through holes 33 that open onto the rear face 8 and also onto the surface 31 of the root ring 18 between two rotor blades 20. The rotor disc 6 has holes 39 for pins 38 afforded in the rotor blades 20 and open on terminal surfaces of said rotor blades 20.

The reinforcement ring 23 has holes 39 for pins 38 and that open onto the face that bears the auxiliary rotor blades 20' and between two subsequent auxiliary rotor blades 20'. The reinforcement ring 23 has threaded seats 34 afforded in the auxiliary rotor blades 20' and that open onto terminal surfaces of said auxiliary rotor blades 20'.

Screws 32 are inserted in the through holes 33 and screwed into the threaded seats 34 of the auxiliary rotor blades 20'. Pins 38 are inserted in the holes 39 of the reinforcement ring 23 and the rotor blades 20 (FIG. 16).

Once the reinforcement ring 23 has been mounted on the rotor disc 6, the set of blades is made up of the alternation of rotor blades 20 of the disc 6 and auxiliary rotor blades 20' and the pitch (the circumferential distance between a blade 20 and the adjacent auxiliary blade 20') is the correct pitch.

Figure 17:
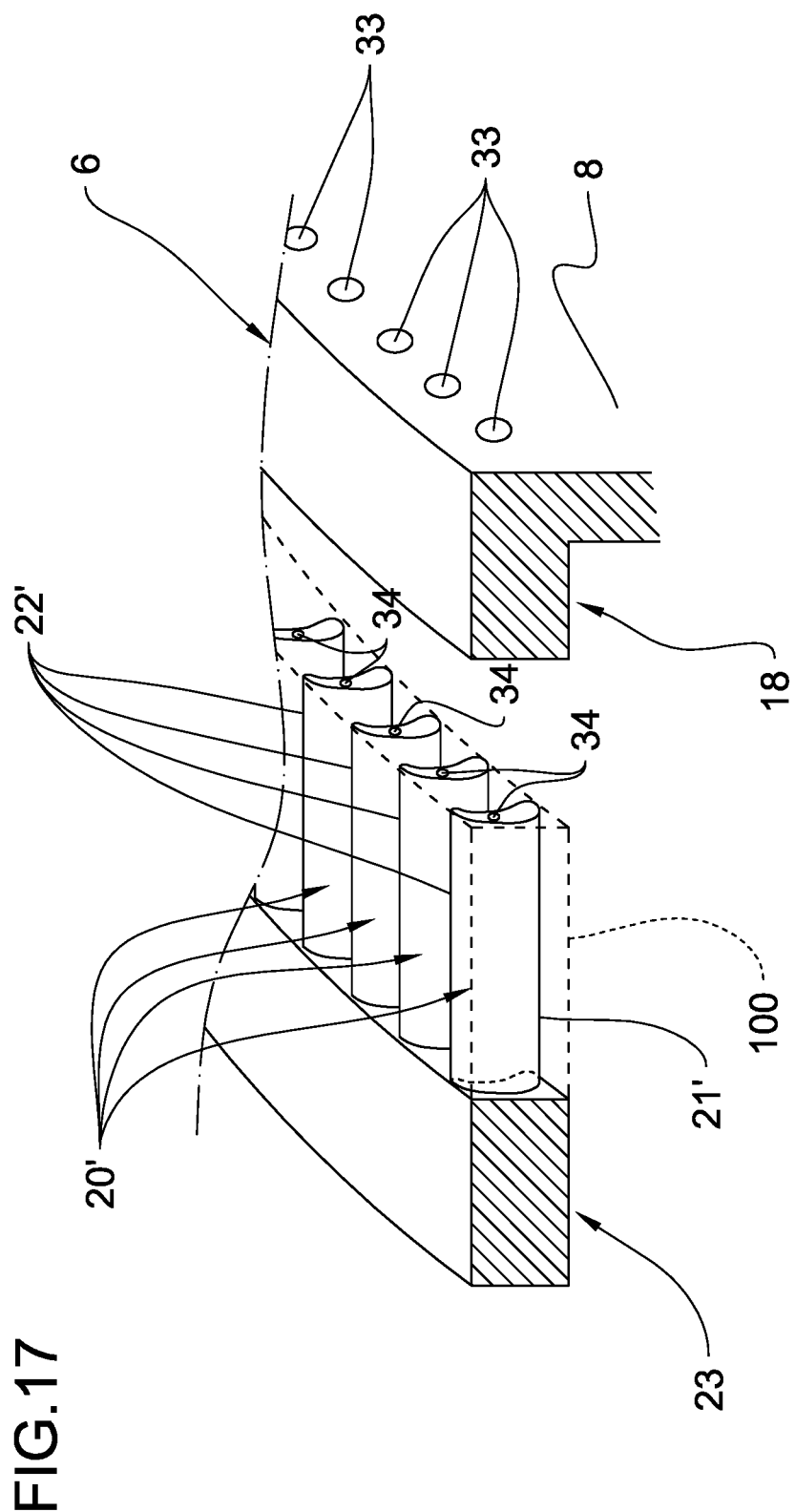
FIG. 17 is a view illustrating the view appearing in FIG. 2, according to a further variant of the construction method.

FIG. 17 illustrates an additional variant of the construction method specified hereinabove, in which all the blades are auxiliary blades 20' fashioned in one piece on the reinforcement ring 23. For this purpose, it is envisioned that a solid ring 100 (shown by the dashed line in FIG. 17) is prepared and material is removed from the solid ring 100 until the respective annular set of auxiliary blades 20' is defined.

The solid disc 27 from which the disc 6 is obtained is instead machined only so as to form a plurality of annular reliefs 28 on the front face 7, said reliefs 28 will define the root rings 18 (of which only one is visible in FIG. 17), without blades and are concentric and coaxial with the central axis "X-X" of said disc 6.

The rotor disc 6 has through holes 33 that open onto the rear face 8 and also onto the surface 31 of the root ring 18 at each auxiliary blade 20' of the reinforcement ring 23. The reinforcement ring 23 has threaded seats 34 that open onto terminal surfaces of said auxiliary rotor blades 20'. Screws 32 are inserted in the through holes 33 and screwed into the threaded seats 34 of the auxiliary rotor blades 20'.

The invention claimed is:

1. A method for construction of bladed discs for radial turbomachines, comprising:
   preparing a disc provided with a front face;
   preparing a plurality of reinforcement rings with different diameters;
   wherein preparing the disc comprises: realizing annular sets of blades in one piece with said disc, the sets of blades being concentric and coaxial with a central axis of said disc and arranged on said front face, wherein each blade has a leading edge and a trailing edge parallel to said central axis,
   and/or
   wherein preparing a plurality of reinforcement rings comprises: realizing in one piece with each one of the reinforcement rings an annular set of auxiliary blades arranged around a central axis of the reinforcement rings, wherein each auxiliary blade has a leading edge and a trailing edge substantially parallel to said central axis of the reinforcement rings; and
   applying each one of the reinforcement rings to the disc at one of the annular sets of blades and/or auxiliary blades, so as to define on the front face annular sets of blades and/or auxiliary blades, each one provided with a respective reinforcement ring;
   wherein preparing each reinforcement ring comprises:
   preparing a solid ring; and
   removing material from the solid ring until a respective annular set of auxiliary blades is defined.

2. The method according to claim 1, wherein preparing the disc comprises:
   preparing a solid disc;
   removing material from the solid disc to define on the front face a plurality of annular reliefs concentric and coaxial with a central axis of said disc; and
   removing material from each annular relief until one of the annular sets of blades is defined, for each annular relief;
   wherein each one of the reinforcement rings is applied on terminal ends of the blades of the disc.

3. The method according to claim 2, wherein realizing the blades comprises applying at least one electrode against at least one annular relief.

4. The method according to claim 3, wherein said at least one electrode has a single working portion shaped like the volume comprised between two adjacent blades, to remove material between said two blades and to define a passage between said two blades.

5. The method according to claim 3, wherein said at least one electrode has a plurality of working portions spaced one away from the other and each one shaped like the volume comprised between two adjacent blades, to remove material between a number of blades at the same time and to define passages between said blades.

6. The method according to claim 2, wherein defining an annular set of blades for each annular relief comprises: shaping a root ring attached to the front face of the disc; wherein the blades of the respective annular set protrude from said root ring.

7. The method according to claim 2, comprising: defining support surfaces for resting the reinforcement rings against the blades, wherein each support surface is the surface in which an end surface of a respective annular relief lies.

8. The method according to claim 1, wherein realizing the auxiliary blades comprises applying at least one electrode against at least one solid ring.

9. The method according to claim 8, wherein said at least one electrode has a single working portion shaped like the volume comprised between two adjacent auxiliary blades, to remove material between said two auxiliary blades and to define a passage between said two auxiliary blades.

10. The method according to claim 8, wherein said at least one electrode has a plurality of working portions spaced one away from the other and each one shaped like the volume comprised between two adjacent auxiliary blades, to remove material between a number of auxiliary blades at the same time and to define passages between said auxiliary blades.

11. The method according to claim 1, wherein, for each set, blades are made in one piece with said disc and auxiliary blades are made in one piece with the respective reinforcement ring.

12. The method according to claim 11, wherein applying each one of the reinforcement rings comprises: placing each auxiliary blade between two blades of an annular set of the disc and applying terminal ends of the auxiliary blades against the front face of the disc.

13. The method according to claim 1, wherein applying the reinforcement rings comprises joining a reinforcement ring to terminal ends of the blades.

14. The method according to claim 1, wherein applying the reinforcement rings comprises joining terminal ends of the auxiliary blades to the disc through connection devices placed on said terminal ends.

15. A method for construction of bladed discs for radial turbomachines, comprising:
preparing a disc provided with a front face;
preparing a plurality of reinforcement rings with different diameters;
wherein preparing the disc comprises: realizing annular sets of blades in one piece with said disc, the sets of blades being concentric and coaxial with a central axis of said disc and arranged on said front face, wherein each blade has a leading edge and a trailing edge parallel to said central axis,
and/or
wherein preparing a plurality of reinforcement rings comprises: realizing in one piece with each one of the reinforcement rings an annular set of auxiliary blades arranged around a central axis of the reinforcement ring, wherein each auxiliary blade has a leading edge and a trailing edge parallel to said central axis of the reinforcement ring; and
applying each one of the reinforcement rings to the disc at one of the annular sets of blades and/or auxiliary blades, so as to define on the front face annular sets of blades and/or auxiliary blades, each one provided with a respective reinforcement ring; wherein, for each set, blades are made in one piece with said disc and auxiliary blades are made in one piece with the respective reinforcement ring.

16. A method for construction of bladed discs for radial turbomachines, comprising:
preparing a disc provided with a front face;
preparing a plurality of reinforcement rings with different diameters;
wherein preparing the disc comprises: preparing a solid disc, removing material from the solid disc to define on the front face a plurality of annular reliefs concentric and coaxial with a central axis of said disc, realizing annular sets of blades in one piece with said disc by removing material from each of the annular reliefs until one of the annular sets of blades is defined for each annular relief, the sets of blades being concentric and coaxial with a central axis of said disc and arranged on said front face, wherein each blade has a leading edge and a trailing edge parallel to said central axis, each one of the reinforcement rings being applied on terminal ends of the blades,
and/or
wherein preparing a plurality of reinforcement rings comprises: realizing in one piece with each one of the reinforcement rings an annular set of auxiliary blades arranged around a central axis of the reinforcement ring, wherein each auxiliary blade has a leading edge and a trailing edge parallel to said central axis of the reinforcement ring; and
applying each one of the reinforcement rings to the disc at one of the annular sets of blades and/or auxiliary blades, so as to define on the front face annular sets of blades and/or auxiliary blades, each one provided with a respective reinforcement ring;
wherein realizing the blades comprises applying at least one electrode against at least one annular relief;
wherein said at least one electrode has a plurality of working portions spaced one away from the other and each one shaped like the volume comprised between two adjacent blades, to remove material between a number of blades at the same time and to define passages between said blades.

* * * * *